United States Patent
Lin

(10) Patent No.: US 9,823,717 B2
(45) Date of Patent: Nov. 21, 2017

(54) ELECTRONIC DEVICE

(71) Applicant: Wistron Corporation, New Taipei (TW)

(72) Inventor: Shih-Jeh Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 262 days.

(21) Appl. No.: 14/183,772

(22) Filed: Feb. 19, 2014

(65) Prior Publication Data

US 2014/0240923 A1    Aug. 28, 2014

(30) Foreign Application Priority Data

Feb. 22, 2013 (TW) .............................. 102106261 A

(51) Int. Cl.
*G06F 1/16* (2006.01)
*G06F 1/20* (2006.01)

(52) U.S. Cl.
CPC ............ *G06F 1/203* (2013.01); *G06F 1/1666* (2013.01); *G06F 1/1669* (2013.01)

(58) Field of Classification Search
None
See application file for complete search history.

(56) References Cited

U.S. PATENT DOCUMENTS

| | | | |
|---|---|---|---|
| 5,659,307 A * | 8/1997 | Karidis ................ | G06F 1/1616 341/20 |
| 6,028,768 A * | 2/2000 | Cipolla ................ | G06F 1/1616 361/679.12 |
| 8,009,143 B2 * | 8/2011 | Huang ................. | G06F 1/1616 345/168 |
| 8,265,705 B2 * | 9/2012 | Lee ....................... | G06F 1/1616 345/169 |
| 8,971,026 B2 * | 3/2015 | Matsuoka ............ | H05K 5/03 16/348 |
| 8,995,125 B2 * | 3/2015 | Matsuoka ............ | G06F 1/1658 361/679.55 |

(Continued)

FOREIGN PATENT DOCUMENTS

| | | |
|---|---|---|
| CN | 2760633 | 2/2006 |
| TW | 201228581 A1 | 7/2012 |

OTHER PUBLICATIONS

"Office Action of China Counterpart Application" with partial English translation, dated Sep. 5, 2016, p. 1-p. 13, in which the listed reference was cited.

*Primary Examiner* — Courtney Smith
*Assistant Examiner* — Rashen E Morrison
(74) *Attorney, Agent, or Firm* — JCIPRNET

(57) ABSTRACT

An electronic device includes a first electronic unit having a top surface, a first pivot side and a receiving groove, a second electronic unit having a second pivot side pivoted to the first pivot side, an internal module movably received in the receiving groove, and first and second magnetic units respectively disposed on the second pivot side and the internal module. The second electronic unit is pivotable between covering and opening positions that covers and that is distant from the top surface, respectively. The second magnetic unit is magnetically attracted by the first magnetic unit to move one side of the internal module out of the receiving groove and toward the second pivot side when the second electronic unit is in the opening position.

11 Claims, 6 Drawing Sheets

(56) References Cited

U.S. PATENT DOCUMENTS

| | | | | |
|---|---|---|---|---|
| 9,092,193 B2* | 7/2015 | Yang | ............... | G06F 1/1632 |
| 9,404,298 B1* | 8/2016 | Chen | ............... | G06F 1/1681 |
| 2004/0190239 A1* | 9/2004 | Weng | ............... | G06F 1/1616 |
| | | | | 361/679.2 |
| 2009/0268386 A1* | 10/2009 | Lin | ............... | G06F 1/1616 |
| | | | | 361/679.02 |
| 2009/0296328 A1* | 12/2009 | Lin | ............... | G06F 1/1616 |
| | | | | 361/679.02 |
| 2010/0277858 A1* | 11/2010 | Zhou | ............... | G06F 1/1669 |
| | | | | 361/679.17 |
| 2011/0023272 A1* | 2/2011 | Huang | ............... | E05D 3/18 |
| | | | | 16/362 |
| 2011/0031766 A1* | 2/2011 | Huang | ............... | E05B 17/0033 |
| | | | | 292/251.5 |
| 2011/0090644 A1* | 4/2011 | Lin | ............... | G06F 1/1616 |
| | | | | 361/679.55 |
| 2011/0194237 A1* | 8/2011 | Weng | ............... | G06F 1/1616 |
| | | | | 361/679.08 |
| 2012/0134089 A1* | 5/2012 | Wu | ............... | G06F 1/169 |
| | | | | 361/679.4 |
| 2012/0293953 A1* | 11/2012 | Wu | ............... | F16M 11/10 |
| | | | | 361/679.56 |
| 2013/0257733 A1* | 10/2013 | Moore | ............... | G06F 1/1618 |
| | | | | 345/168 |
| 2014/0118916 A1* | 5/2014 | Lin | ............... | G06F 1/1669 |
| | | | | 361/679.09 |
| 2014/0240250 A1* | 8/2014 | Lin | ............... | G06F 1/1683 |
| | | | | 345/173 |
| 2014/0299740 A1* | 10/2014 | Peng | ............... | G06F 1/1632 |
| | | | | 248/688 |

* cited by examiner

ELECTRONIC DEVICE

CROSS-REFERENCE TO RELATED APPLICATION

This application claims priority of Taiwanese Patent Application No. 102106261, filed on Feb. 22, 2013.

BACKGROUND OF THE DISCLOSURE

1. Field of the Disclosure

The disclosure relates to an electronic device, and more particularly to an electronic device having a high heat-dissipation efficiency.

2. Description of the Related Art

With the development of electronic devices, operating efficiency of the internal components thereof is enhanced, inevitably increasing the generation of heat inside the electronic devices. If the heat of the electronic device is not quickly and properly dissipated, an operating speed of the electronic device may decrease, thereby affecting a working efficiency thereof. Worst case is, the internal components thereof may be damaged or the system may break down, thereby causing the user to suffer huge economic losses. Therefore, how to enable an electronic device to dissipate heat efficiently is always a subject matter of considerable concern in the industry.

Taking for example a notebook computer, an existing method for improving heat dissipation of the notebook computer is to provide a plurality of additional heat-dissipating holes in each side thereof, or use a heat-dissipating pad to elevate the notebook computer, so that more unblocked heat-dissipating spaces around the notebook computer may be obtained, thereby enhancing the effect of heat dissipation. However, the method of providing additional heat-dissipating holes in the sides of the notebook computer may limit and compress the position and space design of various connection ports on the sides of the notebook computer, while the method of elevating the notebook computer by using the heat-dissipating pad may increase the overall volume thereof, resulting in wastage of space. Further, the use position of the electronic device may also be limited to a flat planar surface where the heat-dissipating pad may be placed. Based on the aforesaid drawbacks, there is room for improvement regarding the heat-dissipating method of the existing electronic device.

SUMMARY OF THE DISCLOSURE

Therefore, an object of the present disclosure is to provide an electronic device having an improved heat dissipation efficiency.

Accordingly, an electronic device of this disclosure comprises a first electronic unit, a second electronic unit, an internal module, a first magnetic unit and a second magnetic unit. The first electronic unit includes a top surface, a first pivot side, and a module receiving groove recessed in the top surface and adjacent to the first pivot side. The second electronic unit is pivotally connected to the first electronic unit along the first pivot side, and is pivotable between a covering position that covers the top surface and an opening position that is distant from the top surface. The second electronic unit includes a second pivot side pivotally connected to the first pivot side. The second pivot side is located above the module receiving groove and is disposed higher than the top surface when the second electronic unit is pivoted to the opening position.

The internal module is movably received in the module receiving groove. The first magnetic unit is disposed on the second pivot side. The second magnetic unit is disposed on the internal module. The second magnetic unit is magnetically attracted by the first magnetic unit to move one side of the internal module out of the module receiving groove and toward the second pivot side when the second electronic unit is located in the opening position.

The efficiency of the present disclosure resides in that by providing the first magnetic unit and the second magnetic unit, when the second electronic unit is located in the opening position, one end portion of the internal module is moved out of the module receiving groove through magnetic attraction between the first and second magnetic units and is spaced apart from the first electronic unit, so that a side of the first electronic unit that is adjacent to the internal module will not be blocked by the internal module, and has more heat-dissipating spaces. It is not necessary to use any complicated movable mechanism to achieve the purpose of enhancing heat-dissipation efficiency.

BRIEF DESCRIPTION OF THE DRAWINGS

Other features and advantages of the present disclosure will become apparent in the following detailed description of the embodiment with reference to the accompanying drawings, of which.

DETAILED DESCRIPTION OF THE PREFERRED EMBODIMENT

Figure 1:
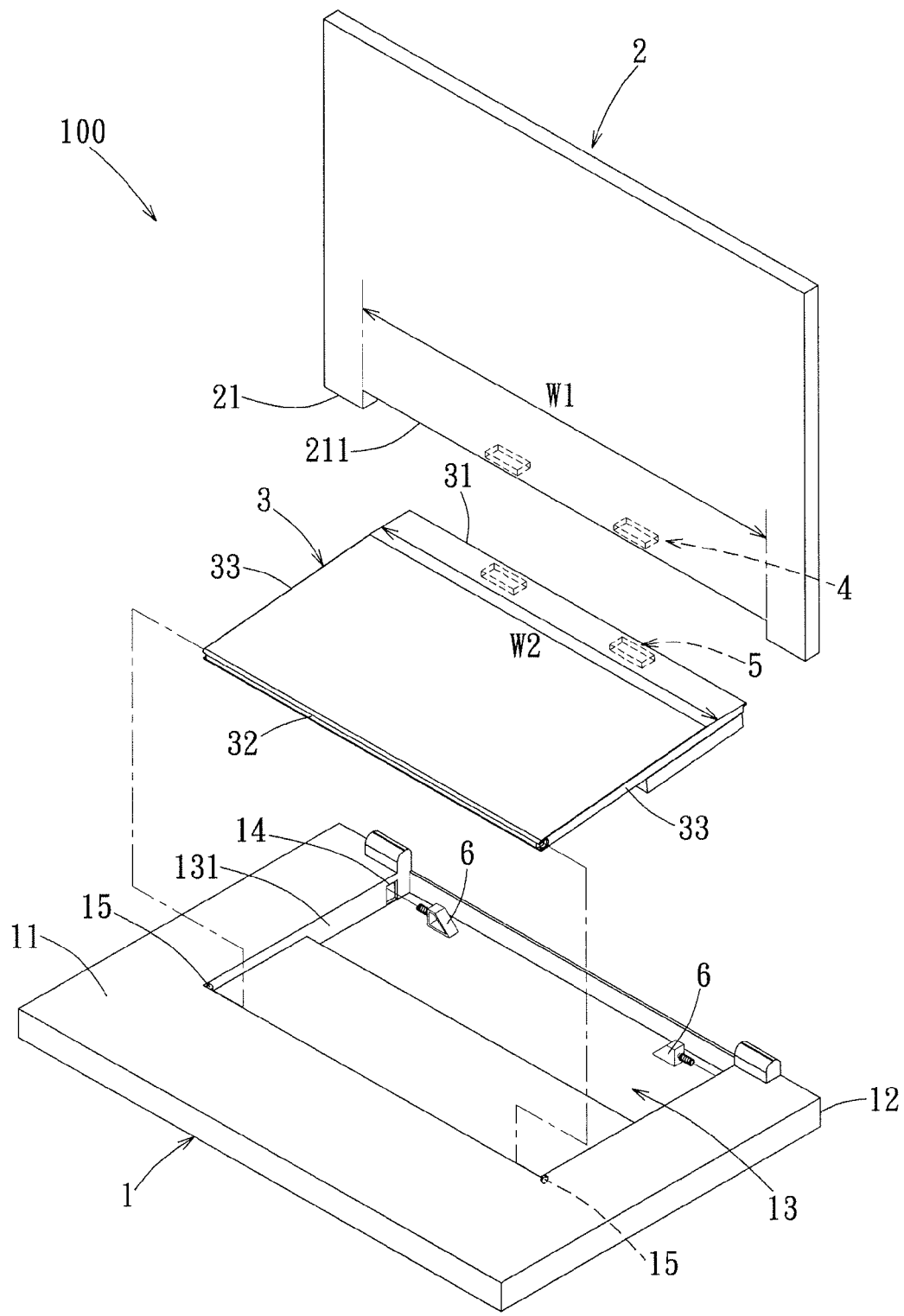
FIG. 1 is an exploded perspective view of an electronic device according to an embodiment of the present disclosure.
Figure 2:
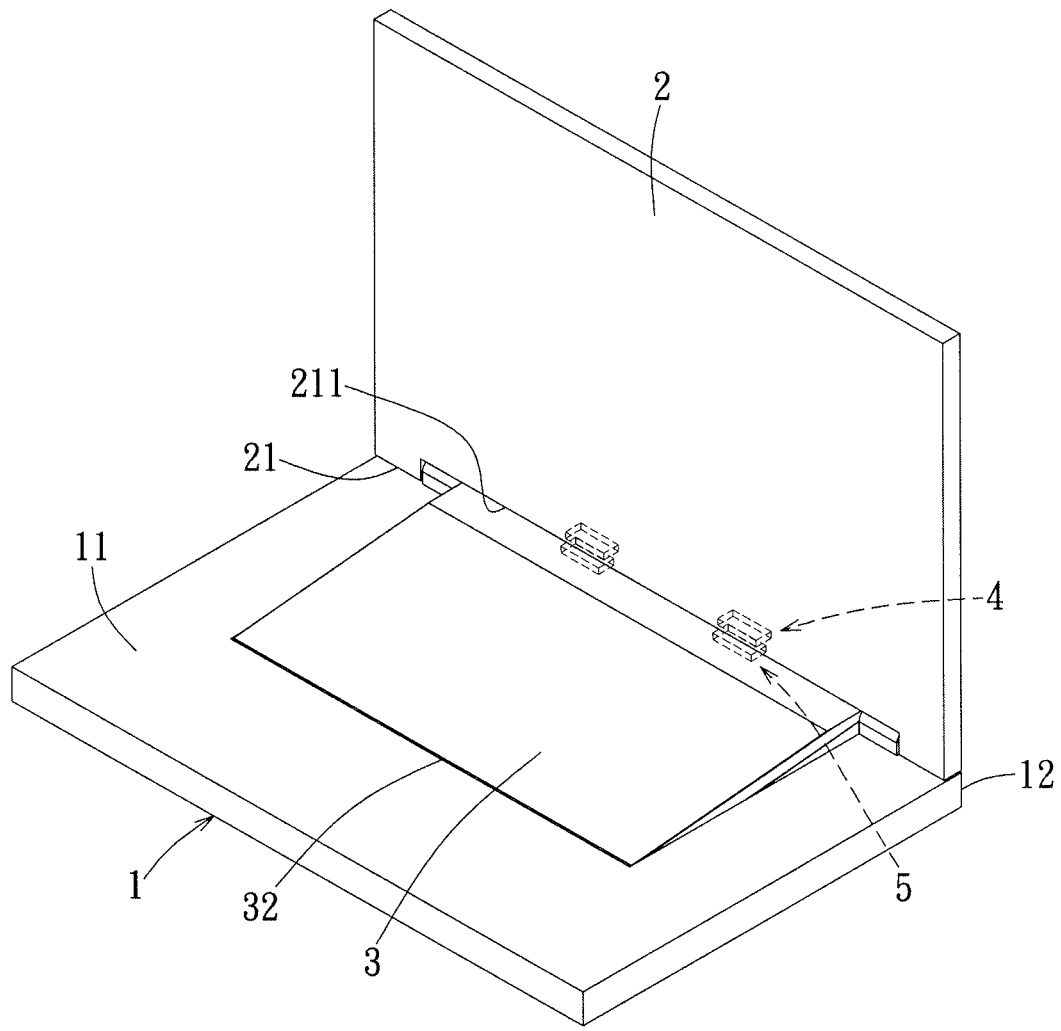
FIG. 2 is a perspective view of the embodiment in an assembled state.

The above-mentioned and other technical contents, features, and effects of this disclosure will be clearly presented from the following detailed description of the embodiment in coordination with the reference drawings.

Referring to FIGS. 1 to 4, an embodiment of an electronic device 100 according to the present disclosure comprises a first electronic unit 1, a second electronic unit 2, an internal module 3, a first magnetic unit 4, and a second magnetic unit 5. In this embodiment, the electronic device 100 is exemplified as a notebook computer, and the first electronic unit 1, the second electronic unit 2, and the internal module 3 are respectively a base, a screen, and a keyboard of the notebook computer.

The first electronic unit 1 includes a top surface 11, a first pivot side 12, and a module receiving groove 13 recessed in the top surface 11 and adjacent to the first pivot side 12. The second electronic unit 2 is pivotally connected to the first electronic unit 1 along the first pivot side 12, and is pivotable between a covering position (see FIG. 3) that covers the top surface 11 and an opening position (see FIG. 4) that is distant from the top surface 11. The second electronic unit 2 has a second pivot side 21, and a recessed portion 211 extending inwardly from the second pivot side 21. When the second electronic unit 2 is pivoted to the opening position, the second pivot side 21 is moved such that the recessed portion 211 is located above the module receiving groove 13, is proximate to the first pivot side 12, and is disposed higher than the top surface 11.

The internal module 3 is up and down movably received in the module receiving groove 13, and includes a movable side 31 adjacent to the first pivot side 12, a connection side 32 opposite to the movable side 31, and two lateral sides 33 connected between the movable side 31 and the connection side 32. Each of the lateral sides 33 is recessed to form an axial pin hole 331 (see FIG. 7) at a position close to the connection side 32. The first electronic unit 1 further includes two axial pins 15 that project inwardly and respectively from two opposite groove sidewalls 131 (only one is visible in FIG. 1) which define the module receiving groove 13 and that respectively extend into the axial pin holes 331 in the lateral sides 33 of the internal module 3 (see FIGS. 7 and 8). As such, the internal module 3 is pivotable relative to the first electronic unit 1 about the axial pins 15.

The recessed portion 211 of the second electronic unit 2 has a length (W1) greater than a length (W2) of the movable side 31 of the internal module 3 (see FIG. 1). The first magnetic unit 4 is embedded in the recessed portion 211 of the second electronic unit 2, and the second magnetic unit 5 is embedded in the movable side 31 of the internal module 3. When the second electronic unit 2 is located in the opening position, the first and second magnetic units 4 and 5 correspond to each other in position, and through their mutual magnetic attraction, the movable side 31 of the internal module 3 is moved upward and out of the module receiving groove 13.

Figure 3:
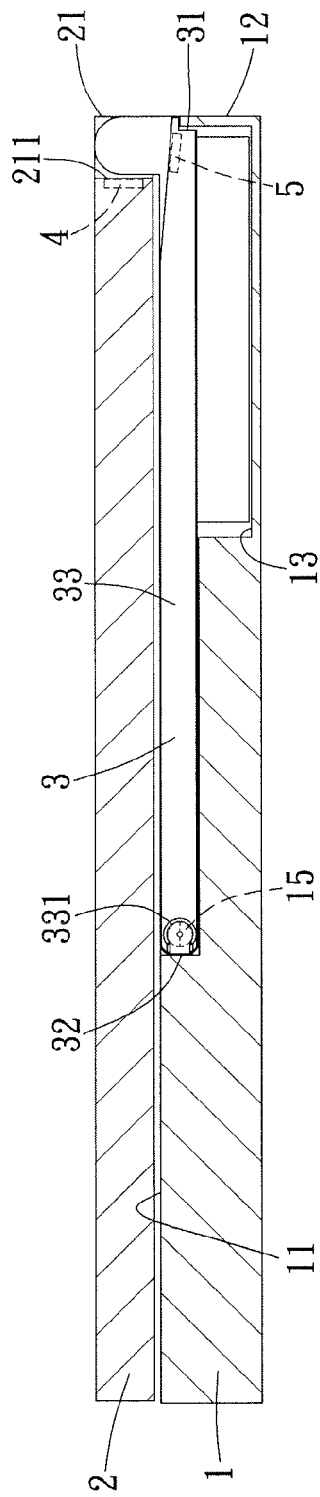
FIG. 3 is a sectional view of the embodiment, illustrating a second electronic unit in a covering position.
Figure 4:
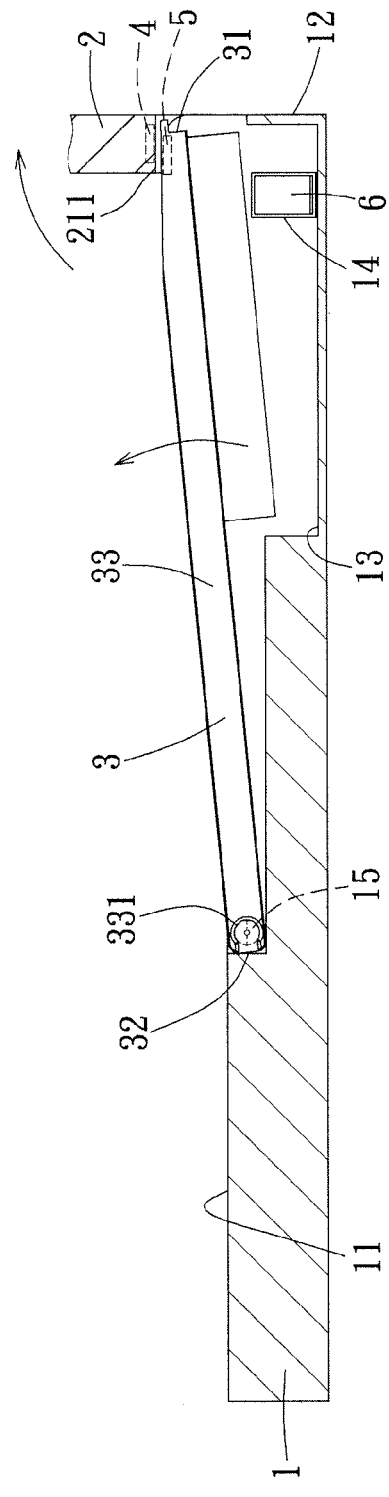
FIG. 4 is a view similar to FIG. 3, but illustrating the second electronic unit in an opening position.

When the second electronic unit 2 is located in the covering position, as shown in FIG. 3, the second electronic unit 2 is superimposed on the first electronic unit 1 and covers the top surface 11. In this state, the internal module 3 is completely received in the module receiving groove 13, so that the overall volume of the electronic device 100 is reduced to facilitate being carried by a user. When the second electronic unit 2 is pivoted to the opening position, as shown in FIG. 4, the second electronic unit 2 is distant from the first electronic unit 1 and does not cover the top surface 11. Meanwhile, the first magnetic unit 4 embedded in the recessed portion 211 is spaced apart from the module receiving groove 13, and the second magnetic unit 5 embedded in the movable side 31 of the internal module 3 is magnetically attracted by the first magnetic unit 4 to move the movable side 31 upwardly into the recessed portion 211. At this time, the internal module 3 pivots relative to the first electronic unit 1 about the axial pins 15 to move the movable side 31 out of the module receiving groove 13, so that a gap is generated between the internal module 3 and the first electronic unit 1. Thus, space for heat dissipation around the first electronic unit 1 can be increased, and the overall heat-dissipation efficiency of the electronic device 100 can be enhanced. In this embodiment, a magnetic attractive force between the first and second magnetic units 4 and 5 is greater than 350 gw, which is sufficient to withstand a force applied on the internal module 3 (keyboard) by the user when typing, so that the first and second magnetic units 4 and 5 will not separate from each other.

Figure 5:
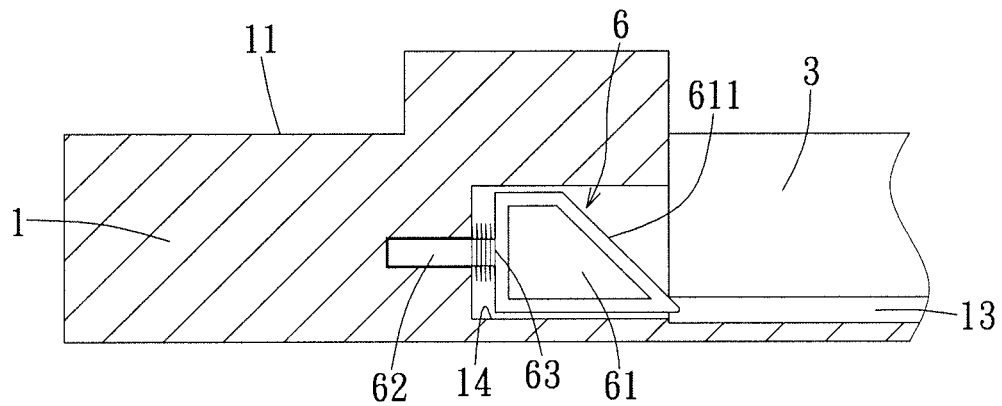
FIG. 5 is an enlarged fragmentary sectional view, illustrating a spring-loaded push mechanism of the embodiment in a receiving slot.
Figure 6:
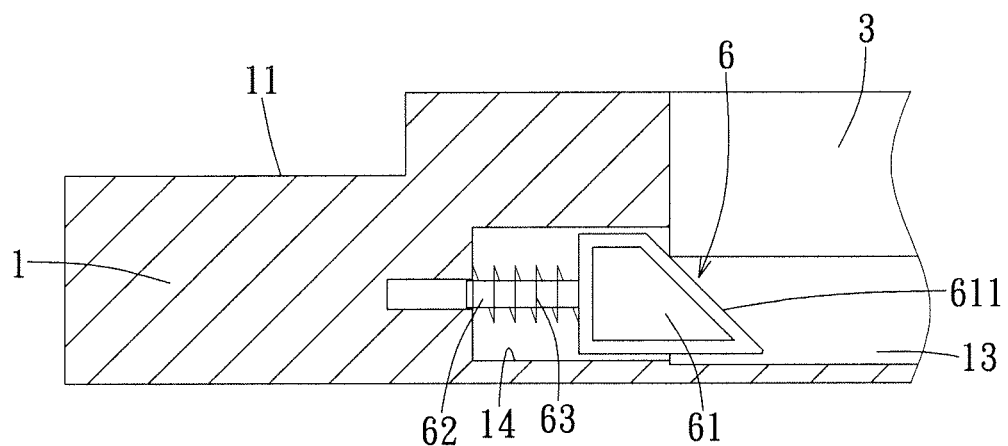
FIG. 6 is a view similar to FIG. 5, but illustrating the spring-loaded push mechanism being moved into a module receiving groove.

Referring to FIGS. 1, 5, and 6, the first electronic unit 1 further includes two receiving slots 14 respectively formed in the groove sidewalls 131 in proximity to the first pivot side 12 and communicating with the module receiving groove 13. The electronic device 100 of this embodiment further comprises two spring-loaded push mechanisms 6 provided on the first electronic unit 1. The spring-loaded push mechanisms 6 are respectively disposed on the lateral sides 33 of the internal module 3, are respectively received in the receiving slots 14, and are movable from the receiving slots 14 into the module receiving groove 13 toward each other. Each of the spring-loaded push mechanisms 6 includes a push body 61, a limiting pin 62 laterally projecting from one side of the push body 61 that is opposite to the internal module 3 toward the first electronic unit 1, and a spring member 63 sleeved on the limiting pin 62 and having two opposite ends respectively abutting against the push body 61 and the first electronic unit 1. The push body 61 has an inclined surface 611 abutting against a bottom of the internal module 3. The spring member 63 biases the push body 61 toward the internal module 3 so that the inclined surface 611 of the push body 61 can push the bottom of the internal module 3, thereby moving the movable side 31 of the internal module 3 upwardly and out of the module receiving groove 13.

When the second electronic unit 2 is located in the covering position, the internal module 3 is pressed into the module receiving groove 13 by the second electronic unit 2, and the lateral sides 33 thereof respectively push the spring-loaded push mechanisms 6 into the respective receiving slots 14 so as to compress the spring members 63 of the spring-loaded push mechanisms 6. When the second electronic unit 2 is pivoted to the opening position, the internal module 3 is no longer limited by the second electronic unit 2, so that the movable side 31 of the internal module 3 can be moved upward and away from the module receiving groove 13. At this time, because of the elastic restoring force of the spring member 63 that pushes the push body 61 to move from the receiving slot 14 into the module receiving groove 13, and by using the inclined surface 611 of the push body 61 to push the bottom of the internal module 3 so as to move the movable side 31 of the internal module 3 upwardly, besides the magnetic attractive force between the first and second magnetic units 4 and 5, an additional force is provided to assist the internal module 3 in moving the movable side 31 thereof upwardly and away from the module receiving groove 13. As such, the movable side 31 of the internal module 3 can easily move upward into the recessed portion 211. When the second electronic unit 2 returns to the covering position from the opening position, the movable side 31 of the internal module 3 will not fall into the module receiving groove 13 and collide with the first electronic unit 1 because of the sudden loss of the upward force acting on the internal module 3 due to separation of the first and second electronic units 4 and 5, but will be smoothly pressed into the module receiving groove 13 by the second electronic unit 2 through the buffer guidance of the inclined surface 611 of each spring-loaded push mechanism 6, so that the internal module 3 is not prone to damage.

Figure 7:
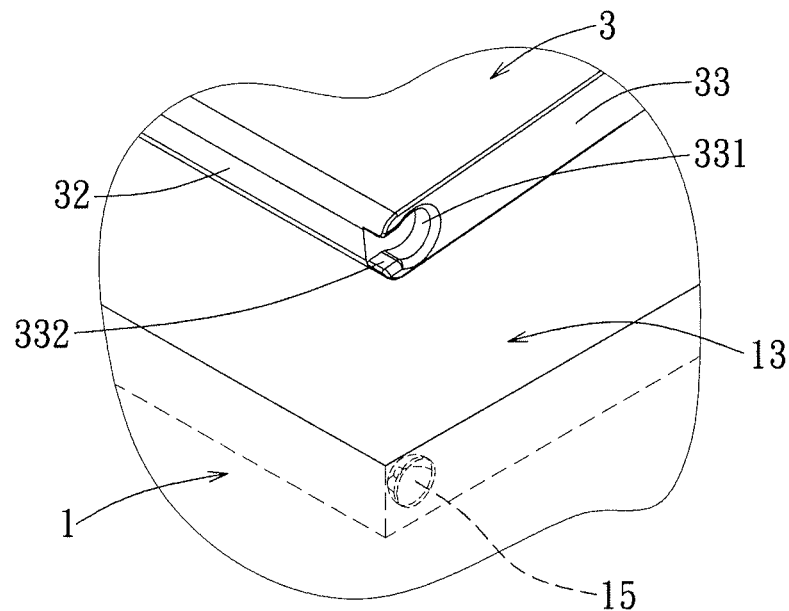
FIG. 7 is an enlarged fragmentary exploded perspective of the first electronic unit and an internal module of the embodiment.
Figure 8:
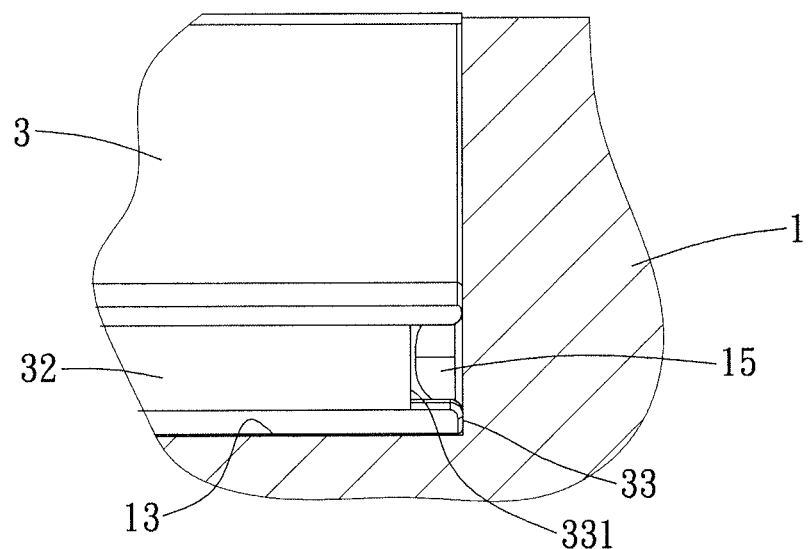
FIG. 8 is an enlarged fragmentary assembled sectional view of the embodiment, illustrating an axial pin being received in an axial pin hole.
Figure 9:
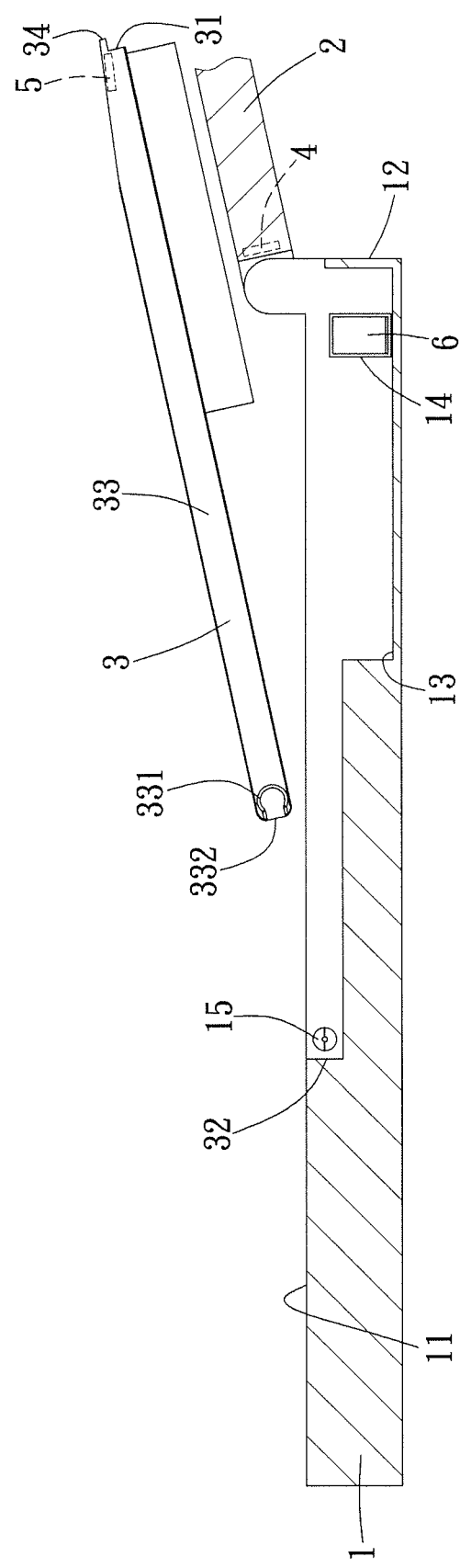
FIG. 9 is a sectional view of the embodiment, illustrating how the internal module may be separated from the second electronic unit.

Referring to FIGS. 7 to 9, each of the axial pinholes 331 of the internal module 3 has an opening 332 facing the connection side 32 for passage of the respective axial pin 15 therethrough, so that the axial pin 15 can move into or away from the axial pin hole 331. As such, the internal module 3 can be engaged to or disengaged from the first electronic unit 1. Thus, the user may replace the original internal module 3 with another different internal module according to his/her requirements. For example, a keyboard module of the notebook computer may be replaced with a battery module or a handwriting board module, so that, in use, the electronic device 100 has good expandability and variability. An outer peripheral surface of each axial pin 15 is curved to guide entry of each axial pin 15 into the respective axial pin hole 331, thereby easily assembling the internal module 3 to the first electronic unit 1. Moreover, the internal module 3 further includes a stepped portion 34 formed on and extending along the length of the movable side 31 to facilitate grasping thereof by the user when separating the internal module 3 from the first electronic unit 1. Thus, the internal module 3 can be easily removed from the module receiving groove 13 of the first electronic unit 1 through the presence of the stepped portion 34.

It is worth mentioning that although two spring-loaded push mechanisms 6 are provided in this embodiment for pushing the bottom of the internal module 3, in actual practice, the number and position of the spring-loaded push mechanisms 6 are not limited to the disclosures in this embodiment. Alternatively, only one spring-loaded push mechanism 6 may be provided directly under the internal module 3. As long as the movable side 31 of the internal module 3 may be guided smoothly to move upwardly and downwardly, any form of the spring-loaded push mechanism 6 is acceptable.

To sum up, by providing the first magnetic unit 4 and the second magnetic unit 5 in the electronic device 100 of the present disclosure, when the second electronic unit 2 is located in the opening position, the first magnetic unit 4 and the second magnetic unit 5 are close to each other due to mutual magnetic attraction, and the movable side 31 of the internal module 3 is moved away from the module receiving groove 13, thereby increasing the space of the first electronic unit 1 for heat dissipation. Further, because the first and second magnetic units 4 and 5 are respectively embedded in the second electronic unit 2 and the internal module 3, not only does additional volume of the electronic device 100 unnecessary, but also the provision of any exposed complicated movable mechanism is not required, so that the production of the electronic device 100 is easy, has a high reliability, and is not prone to damage. Moreover, the spring-loaded push mechanisms 6 are designed to smoothly guide the internal module 3 during upward and downward movement thereof, so that the internal module 3 will not collide with the first electronic unit 1 and be damaged due to a sudden change of the magnetic force. Additionally, the internal module 3 and the first electronic unit 1 are pivoted together through interengagement of the axial pin holes 331 each having the opening 332 and the respective axial pins 15. Each axial pin 15 can be engaged to and disengaged from the respective axial pin hole 331 through the opening 332, so that the electronic device 100 can be freely replaced with different internal modules 3 to produce an abundance of expandability. Therefore, the object of the present disclosure can be achieved.

While the present disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An electronic device, comprising:
   a first electronic unit including a top surface, a first pivot side, and a module receiving groove recessed in said top surface and a side of the module receiving groove is aligned with and parallel to said first pivot side;
   a second electronic unit pivotally connected to said first electronic unit along said first pivot side and pivotable between a covering position that covers said top surface and an opening position that is distant from said top surface, said second electronic unit including a second pivot side pivotally connected to said first pivot side, said second pivot side being located above said module receiving groove and being disposed higher than said top surface when said second electronic unit is pivoted to said opening position;
   an internal module movably received in said module receiving groove, wherein said internal module is entirely surrounded by a plurality of inner walls of said module receiving groove when said second electronic unit is located in said covering position;
   a first magnetic unit disposed on said second pivot side; and
   a second magnetic unit disposed on said internal module, said second magnetic unit being magnetically attracted by said first magnetic unit to move one side of said internal module out of said module receiving groove and toward said second pivot side when said second electronic unit is located in said opening position.

2. The electronic device as claimed in claim 1, wherein said internal module includes a movable side adjacent to said first pivot side and having said one side of said internal module, a connection side opposite to said movable side, and two opposite lateral sides connected between said movable side and said connection side, each of said lateral sides being recessed to form an axial pin hole at a position close to said connection side, said first electronic unit further including two axial pins respectively extending into said axial pin holes of said lateral sides so that said internal module is pivotable about said axial pins.

3. The electronic device as claimed in claim 2, wherein each of said axial pin holes has an opening facing said connection side for passage of a respective one of said axial pins therethrough.

4. The electronic device as claimed in claim 3, wherein an outer peripheral surface of each of said axial pins is curved.

5. The electronic device as claimed in claim 3, wherein said internal module further includes a stepped portion formed on said movable side.

6. The electronic device as claimed in claim 2, wherein said second pivot side has a recessed portion, said recessed portion having a length greater than that of said movable side, said first magnetic unit being embedded in said recessed portion, said second magnetic unit being embedded in said movable side.

7. The electronic device as claimed in claim 2, further comprising at least one spring-loaded push mechanism provided on said first electronic unit and abutting against said internal module, said spring-loaded push mechanism being movable into said module receiving groove, and providing a resilient biasing force to urge said internal module out of said module receiving groove.

8. The electronic device as claimed in claim 7, comprising two said spring-loaded push mechanisms, said spring-loaded push mechanisms being respectively disposed on said lateral sides of said internal module, and being movable into said module receiving groove toward each other.

9. The electronic device as claimed in claim 8, wherein each of said spring-loaded push mechanisms includes a push body, a limiting pin projecting from said push body toward said first electronic unit, and a spring member sleeved on said limiting pin and having two opposite ends respectively abutting against said push body and said first electronic unit.

10. The electronic device as claimed in claim 9, wherein said push body of each said spring-loaded push mechanism has an inclined surface abutting against said internal module.

11. The electronic device as claimed in claim 8, wherein said first electronic unit further includes two receiving slots respectively formed in two groove sidewalls that define said module receiving groove and communicating with said module receiving groove, said receiving slots respectively receiving said spring-loaded push mechanisms.

\* \* \* \* \*